United States Patent Office 3,007,904
Patented Nov. 7, 1961

3,007,904
PROCESS FOR PREPARING HIGH MOLECULAR OLEFIN POLYMERS USING A CATALYST CONSISTING OF AN ALUMINO-ORGANIC COMPOUND, AN INORGANIC HEAVY METAL SALT AND OXYGEN
Herbert Kreuter, Eschborn (Taunus), and Siegfried Sommer and Hans Gunter Kirschner, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 18, 1957, Ser. No. 672,570
Claims priority, application Germany July 27, 1956
10 Claims. (Cl. 260—88.2)

The present invention relates to a process for preparing high molecular olefin polymers.

In U.S. patent application Serial No. 566,071, filed February 17, 1956, by Roderich Graf and Ernst Jacob for "Process for Preparing High Molecular Polyethylenes," is described a process for preparing high molecular polyethylenes by polymerizing ethylene with catalyst systems of organo-aluminum compounds and compounds of the metals titanium, zirconium, hafnium, vanadium, niobium, tantalum, chromium, molybdenum, tungsten, thorium and uranium, wherein the polymerization is carried out in the presence of small amounts of oxygen contained in the reaction mixture.

Further processes as disclosed in Belgian Patents 533,362, 534,792 and 534,888 describe the manufacture of high molecular polyolefins and copolymers of olefins, which are obtained by contacting olefins, such as ethylene or propylene or mixtures thereof with catalyst initiator mixtures consisting of organo-metal compounds and salts of titanium, zirconium, hafnium, vanadium, niobium, chromium, molybdenum, tungsten, thorium and uranium. Catalyst mixtures of organo-aluminum compounds and titanium tetrachloride have proved especially advantageous.

The processes referred to above are defined as low pressure processes and may readily be carried out under atmospheric pressure or under a slight super-atmospheric pressure up to about 150 atmospheres.

The polymerization proceeds very slowly under normal reaction conditions. It has been found, however, that the polymerization velocity is considerably increased in certain cases by addition of oxygen to the ethylene to be polymerized.

The addition of oxygen is especially useful, if the organo-aluminum compound is used in a low concentration with respect to the titanium component present in the reaction mixture. The type of organo-aluminum compound used determines, however, the influence of oxygen on the polymerization velocity. If, for example, in the polymerization of ethylene, oxygen is added with the use of a catalyst prepared as described in U.S. patent application Serial No. 566,071, it is found that aluminum sesquichloride has a better velocity-increasing effect than aluminum triethyl.

Such a catalyst is prepared according to the description of the before-mentioned patent application by reduction of a compound of one of the heavy metals mentioned above with an organo-aluminum compound. The products obtained by this reaction are separated and, apart from said separated precipitate, small amounts of an organo-aluminum compound are added to the reaction mixture.

As organo-aluminum compounds, there may be used trialkyl-aluminum compounds, wherein the methyl-, ethyl-, propyl-, butyl-, isopropyl-, isobutyl- or any other aliphatic radical containing up to 8 carbon atoms, or mixtures of these radicals, may be present in the trialkyl compound.

It is also possible to use alkyl-aluminum halides of the general formula:

$$AlR_mHal_n$$

wherein R represents an aliphatic radical containing 1 to 8 carbon atoms, Hal represents chlorine and bromine radicals, $m$ and $n$ each are a whole number of 1 or 2, and the sum of $m+n=3$. As compounds of this kind, there may be mentioned more especially, for example, diethyl - aluminum monochloride, monoethyl - aluminum dichloride or the equimolecular mixture of these two compounds, i.e., ethyl-aluminum sesquichloride.

As compounds of the metals titanium, zirconium, etc., there can be used both organic compounds, such as esters of titanium, wherein the ester group may contain 1 to 4 carbon atoms, titanium acetonyl-acetonate or titanium chloracetate and, naturally, corresponding compounds of the other metals which have been referred to above. As inorganic compounds of the aforesaid metals titanium, zirconium, hafnium, vanadium, etc., there can be used, especially, the halides, such as chlorides or bromides, for example, titanium tetrachloride.

This invention provides a process for the manufacture of high molecular polyolefins and olefin copolymers by polymerizing olefins containing at least 3 carbon atoms or mixtures thereof with ethylene in the presence of catalyst systems of the metals titanium, zirconium, hafnium, vanadium, niobium, chromium, molybdenum, tungsten, thorium and uranium, wherein small amounts of oxygen are introduced into the reaction mixture.

The process of this invention may be carried out with particular advantage with the use of aluminum trialkyl as a constituent of the catalyst component, this being surprising. If propylene or mixtures of ethylene and propylene are polymerized under low pressure while adding small amounts of oxygen together with aluminum triethyl, it is found that the polymerization velocity is considerably increased as compared with a polymerization process carried out with the exclusion of oxygen.

As a result of the oxygen addition according to this invention, it is now possible to polymerize olefins containing at least 3 carbon atoms and mixtures thereof with ethylene, at a fairly great polymerization velocity while using the less active diethyl aluminum monochloride or aluminum sesquichloride.

A further advantage of this invention resides in the fact that the molecular weights may be regulated by the quantity of oxygen added.

Since in most cases the polymerization of this type of monomers was carried out at a temperature between 50 and 80° C. in the presence of the aforesaid catalysts, is should have been expected that the oxygen added during the polymerization would make the products undergo at least a partial oxidation. It has now been ascertained that the oxygen added does not impair the quality of the resulting polymers, this being surprising.

The finished polymers have a high quality and are produced in an economic manner which is proved by the fact that the consumption of organo-aluminum component may be considerably reduced by adding oxygen during the polymerization.

If a mixture of 90 parts by weight of ethylene and 10 parts by weight of propylene is polymerized with aluminum triethyl in the absence of oxygen, it is found that the finished polymer contains only 7–8 parts by weight of polymerized propylene. Accordingly, ethylene is preponderantly polymerized. It has surprisingly been found that the addition of oxygen has the effect to yield a copolymer containing the total propylene, i.e. 10 parts by weight in the above example. This means that the less active component may be better polymerized if the polymerization is carried out while adding oxygen. It has thus become possible to obtain copolymers having a composition which accurately corresponds to the proportion of the added monomers. The process of this invention accordingly represents a valuable advance in the art.

In carrying out the process of this invention care must be taken that the oxygen is used in not too high a concentration, since otherwise the organo-aluminum compound and the reduced titanium component would be oxidized to yield compounds inactive in polymerization. Experience has shown that it is advantageous to use monomers containing between 0.001 and 0.15% by volume, preferably between 0.01 and 0.07% by volume of oxygen.

The concentration of oxygen to be used in the polymerization will be selected in accordance with the desired molecular weights of the resulting polymers. The addition of oxygen reduces the molecular weight (determined by the reduced viscosity measured as a 0.5% solution in tetrahyrdonaphthalene at 120° C.).

The following table is a schematic review as to the influence of oxygen on polymerization velocity, yield, consumption of catalyst, molecular weight (specific viscosity) and bulk weight of the polymers.

TABLE

| Monomer | oxygen content in percent calculated upon monomer | polymerization liquid, parts by weight | titanium catalyst, parts by weight | aluminum triethyl, parts by weight | yield in polymers, parts by weight | reduced viscosity | bulk weight, gram/liter |
|---|---|---|---|---|---|---|---|
| 80 Parts E:20 parts P | 0.001 | 400 | 0.6 | 1.8 | 90 | 15.4 | 190 |
| 80 Parts E:20 parts P | 0.04 | 400 | 0.6 | 1.2 | 190 | 3.2 | 320 |
| 92 Parts E:8 parts P | 0.001 | 400 | 0.4 | 1.8 | 110 | 10.3 | 210 |
| 92 Parts E:8 parts P | 0.03 | 400 | 0.4 | 1.0 | 260 | 3.6 | 325 |
| P | 0.001 | 400 | 0.8 | 1.9 | 70 | 31.7 | 220 |
| P | 0.025 | 400 | 0.8 | 1.4 | 220 | 2.8 | 410 |

E=ethylene.
P=propylene.

The oxygen may be mixed with the monomer or the monomer mixture or may be introduced separately into the reaction vessel. It is evident that suitable oxygen-gas mixtures, for example air, may also be used.

The following examples serve to illustrate the invention, but they are not intended to limit it thereto, the parts being by weight unless otherwise stated.

Example 1

An ethylene-propylene-gas mixture (proportion 92:8) containing 0.03% by volume of oxygen was introduced at 60° C. while stirring well into a suspension of 0.4 part of a titanium catalyst in 400 parts of a mixture of saturated aliphatic hydrocarbons boiling between 70 and 90° C. A small amount of aluminum triethyl solution (2½% by volume) in the aforesaid hydrocarbon was added and polymerization set in rapidly; a solution of aluminum triethyl was repeatedly added and polymerization was continued for several hours while a constant amount of gas was absorbed. After 4 hours, the polymer magma was mixed with 50 parts of isopropanol, the polymer was separated from the solvent by means of a centrifuge and then dried in a vacuum drying cabinet at 50° C.

260 parts of a white finely granular copolymer were obtained with a bulk weight of 325 grams/liter. The reduced viscosity of the product obtained was 3.6, measured as a 0.5% solution in tetrahydronaphthalene at 120° C.

The polymerization carried out with the use of a practically oxygen-free gas mixture under otherwise the same conditions, yielded only 110 parts of a polymer. The reduced viscosity was then about 10.3 and the product had a bulk weight of 210 grams/liter.

Example 2

An ethylene-propylene gas mixture (proportion 80:20) was introduced at 45–50° C. into a stirred suspension of 0.6 part of the catalyst of Example 1 in 400 parts of a saturated aliphatic hydrocarbon mixture boiling at 200–220° C. 0.2% by volume of air calculated upon the monomer mixture to be polymerized was then added. A 5% solution of aluminum triethyl was added and polymerization set in fairly rapidly which was continued for some hours by adding a further amount of aluminum triethyl, thus maintaining the monomer absorption constant. After 5 hours, the polymer magma was mixed with 70 parts of butanol, the polymer was separated from the solvent by means of a filter and then dried in the vacuum drying cabinet.

190 parts of a white finely granular powder was obtained. The product had a reduced viscosity of 3.2 (measured as a 0.5% solution in tetrahydronaphthalene at 120° C.). The polymerization carried out under the same conditions in the absence of air yielded only 90 parts of polymer; the specific viscosity of the copolymer so obtained was increased to 15.4.

Example 3

0.8 part of a titanium catalyst were suspended in 400 parts of methylcyclohexane, the suspension was heated to 40° C. while stirring and propylene was added containing 0.025% by volume of oxygen. By the addition of an organo-aluminum compound a good propylene absorption was reached which was kept at a constant level by permanent addition of activator. Polymerization was interrupted after 4 hours and the polymer suspension was worked up in the usual manner.

220 parts of a polymer with a bulk weight of 410 grams/liter and a reduced viscosity of 2.8 were obtained. 1.4 parts of organo-aluminum compound were consumed for polymerization activation.

The same polymerization process carried out with exclusion of oxygen yielded only 70 parts of polypropylene which had a reduced viscosity of 31.7.

We claim:
1. A process for preparing high molecular polyolefins which comprises contacting an olefin mixture containing 8–100% by volume propylene and 92–0% by volume ethylene with a catalyst system consisting of (1) an alumino-organic compound and (2) an inorganic salt of a metal selected from the group consisting of titanium, zirconium, hafnium, vanadium, niobium, tantalum, chromium, molybdenum, tungsten, thorium and uranium in an inert solvent at a temperature between 40 and 80° C. and a pressure between 0 and 150 atmospheres gauge while adding oxygen in an amount of at least 0.025% by volume, calculated on the olefins, to the reaction mixture, the addition of oxygen serving to increase the polymerization rate, and subsequently separating the polymerization product, the molecular weight of the latter diminishing when increasing amounts of oxygen are added to the reaction mixture.

2. Process of claim 1 wherein oxygen is added to the reaction mixture in an amount of 0.025–0.07% by volume, based on the volume of olefins.

3. The process of claim 1 wherein the olefin consists essentially of propylene.

4. The process of claim 1 wherein the oxygen is added in the form of air.

5. The process of claim 1 wherein the alumino-organic compound is ethyl alumino sesquichloride.

6. The process of claim 1 wherein the alumino-organic compound is diethyl aluminum monochloride.

7. The process of claim 1 wherein the alumino-organic compound is an aluminium trialkyl.

8. The process of claim 7 wherein the alumino-organic compound is aluminum triethyl.

9. A process for preparing high molecular polyolefins which comprises contacting an olefin mixture containing 8–100% by volume propylene and 92–0% by volume ethylene with a catalyst system consisting of (1) an alumino-organic compound and (2) an inorganic titanium halide in an inert solvent at a temperature between 40 and 80° C. and a pressure between 0 and 150 atmospheres gauge while adding oxygen in an amount of at least 0.025% by volume, calculated on the olefins, to the reaction mixture, the addition of oxygen serving to increase the polymerization rate, and subsequently separating the polymerization product, the molecular weight of the latter diminishing when increasing amounts of oxygen are added to the reaction mixture.

10. A process for preparing high molecular polyolefins which comprises contacting a mixture of 80–92% by volume ethylene and 20–8% by volume propylene with a catalyst system consisting of aluminum triethyl and titanium tetrachloride in a mixture of saturated aliphatic hydrocarbons at a temperature in the range between 45–60° C. and a pressure between 0 and 150 atmospheres gauge, while adding at least 0.025% by volume oxygen calculated on the olefins to the reaction mixture, the addition of oxygen serving to increase the polymerization rate, and subsequently separating the polymerization product, the molecular weight of the latter diminishing when increasing amounts of oxygen are added to the reaction mixture.

References Cited in the file of this patent

UNITED STATES PATENTS

| | | |
|---|---|---|
| 2,822,357 | Brebner et al. | Feb. 4, 1958 |
| 2,827,446 | Breslow | Mar. 18, 1958 |
| 2,839,515 | Davision et al. | June 17, 1958 |
| 2,868,772 | Ray et al. | Jan. 13, 1959 |

FOREIGN PATENTS

| | | |
|---|---|---|
| 538,782 | Belgium | Dec. 6, 1955 |